(12) United States Patent
Thomassin et al.

(10) Patent No.: US 7,681,440 B2
(45) Date of Patent: Mar. 23, 2010

(54) METHOD AND APPARATUS FOR TURBINE ENGINE DYNAMIC CHARACTERIZATION

(75) Inventors: Jean Thomassin, Ste-Julie (CA); Marc-Andre Gareau, Montreal (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 65 days.

(21) Appl. No.: 11/930,584

(22) Filed: Oct. 31, 2007

(65) Prior Publication Data

US 2009/0107223 A1  Apr. 30, 2009

(51) Int. Cl.
G01M 15/14  (2006.01)

(52) U.S. Cl. .................................................. 73/112.05

(58) Field of Classification Search .. 73/112.01–112.06
See application file for complete search history.

(56) References Cited

U.S. PATENT DOCUMENTS

| | | | |
|---|---|---|---|
| 3,326,033 A | 6/1967 | Stephenson et al. | |
| 3,335,601 A | 8/1967 | Feldman et al. | |
| 3,442,115 A | 5/1969 | Slutsky et al. | |
| 4,051,351 A | 9/1977 | Mallick, Jr. et al. | |
| 4,103,544 A | 8/1978 | Beckmann et al. | |
| 4,216,672 A | 8/1980 | Henry et al. | |
| 4,428,227 A | 1/1984 | Yamagata et al. | |
| 4,615,008 A | 9/1986 | Rosenbush et al. | |
| 4,703,326 A * | 10/1987 | Ding et al. | 340/870.16 |
| 5,010,727 A * | 4/1991 | Cox | 60/776 |
| 5,113,646 A * | 5/1992 | Cox | 60/776 |
| 6,220,086 B1 * | 4/2001 | Andrew et al. | 73/112.06 |
| 7,100,377 B2 * | 9/2006 | Kraft | 60/776 |
| 7,200,538 B2 * | 4/2007 | Parsons et al. | 703/7 |
| 2004/0172950 A1 * | 9/2004 | Venkataramani et al. | 60/776 |

* cited by examiner

*Primary Examiner*—Lisa M Caputo
*Assistant Examiner*—Freddie Kirkland, III
(74) *Attorney, Agent, or Firm*—Ogilvy Renault LLP

(57) ABSTRACT

A method and apparatus for conducting dynamic characterization of a gas turbine engine which involves generating exciting pressure pulses and measuring responses in the engine, and, in one aspect, then analyzing the measured response for engine dynamic characteristics.

14 Claims, 6 Drawing Sheets

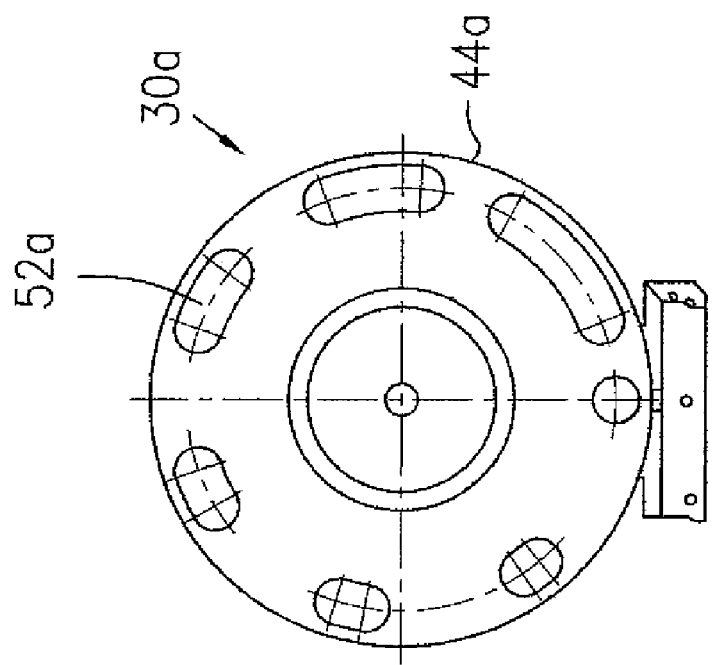
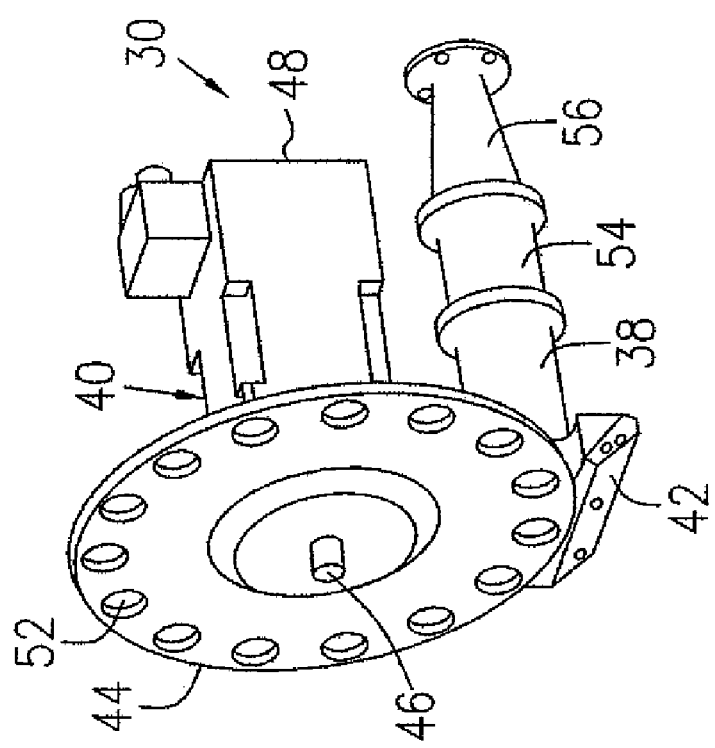

METHOD AND APPARATUS FOR TURBINE ENGINE DYNAMIC CHARACTERIZATION

TECHNICAL FIELD

The invention relates generally to gas turbine engines and, more particularly, to a method and apparatus for turbine engine dynamic characterization.

BACKGROUND OF THE ART

Dynamic structural characterization tests are known and applied in some industries for improving new designs of products and machines. For example, in the machine tool manufacturing industry, important machine tool parts such as main spindles may be subjected to dynamic structural characterization tests in which an exciting impact force may be applied to a main spindle being studied, and structural vibratory responses are measured and processed to obtain a response frequency spectrum. Information regarding the characterizations of the machine tools can then be obtained in an analysis of the response frequency spectrum of the main spindle and such information may be used in the design of a next generation of machine tools to improve the quality of the machine tools. Gas turbine engines are very complicated systems. Therefore, it is desirable but difficult to conduct an effective test for gas turbine engine dynamic characterization, particularly under engine operation conditions, in order to obtain information regarding dynamic characteristics of the engine system and particular engine structures which may be used for engine design improvement with respect to engine performance efficiency, safety issues, etc.

Accordingly, there is a need to provide a method and apparatus for running turbine engine dynamic characterizations.

SUMMARY OF THE INVENTION

In one aspect, the provided is a method for conducting dynamic characterization of a gas turbine engine which comprises (a) generating a plurality of exciting pressure pulses in series in a fluid flow passing through a main gas path of the gas turbine engine, the exciting pressure pulses having varying frequencies; (b) measuring a response in at least one location of the gas turbine engine, excited by the exciting pressure pulses with varying frequencies; and (c) analyzing the measured response for engine dynamic characteristics.

In another aspect, the provided is an apparatus for gas turbine engine dynamic characterization comprising a passage adapted to be connected to the gas turbine engine in fluid communication with a main gas path of the gas turbine engine, means for exciting an air flow passing through the passage to generate a series of exciting pressure pulses therein and means for changing frequencies of the generated exciting pressure pulses.

In a further aspect, the provided is an apparatus for generating a plurality of pressure pulses in an air flow for testing dynamic characteristics of a gas turbine engine, the apparatus comprising an air flow passage adapted to be connected to the gas turbine engine to allow an air flow to be injected into or bled from the gas turbine engine; and a pressure pulsing device for generating the plurality of pressure pulses in the air flow with varying frequencies.

Further details of these and other aspects will be apparent from the detailed description and figures included below.

DESCRIPTION OF THE DRAWINGS

Reference is now made to the accompanying figures, in which:

FIG. 2 is a perspective view of an apparatus for generating exciting pressure pulses in an air flow, used for testing the engine of FIG. 1, according to one embodiment;

FIG. 3 is a front elevational view of the apparatus similar to that of FIG. 2, illustrating a plurality of various-sized openings in a pulsing wheel of the apparatus according to another embodiment;

FIG. 6b is a graphic illustration of the exciting pressure pulses generated in the air flow of FIG. 6a;

DETAILED DESCRIPTION OF THE EMBODIMENTS

Figure 1:
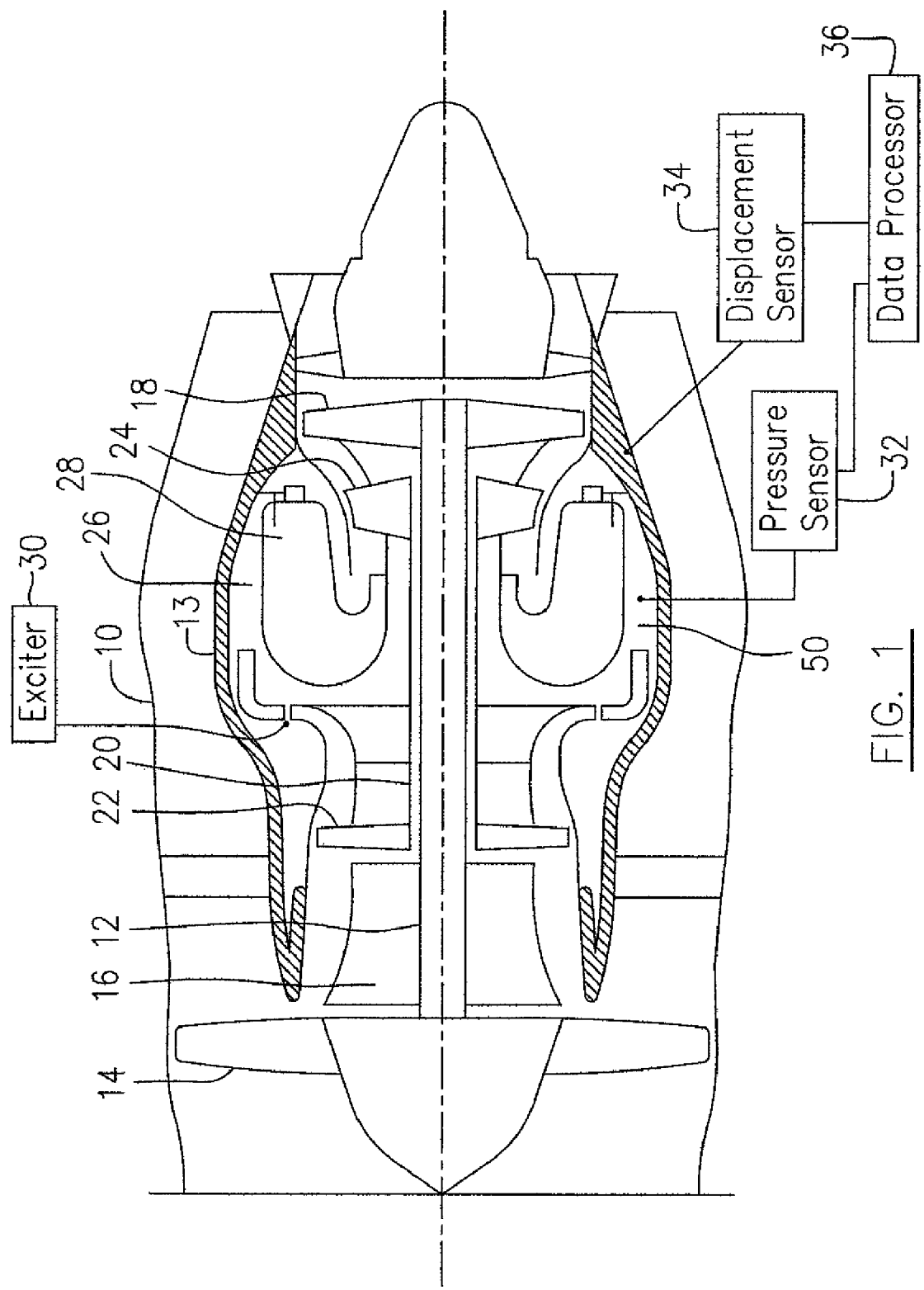
FIG. 1 is a schematic cross-sectional view of an exemplary gas turbine engine which is subjected to a test for dynamic characteristics thereof in accordance with one embodiment.

Referring to FIG. 1, a turbofan gas turbine engine presented as an example of the application of the present approach, includes a housing or nacelle 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20, in order to define an engine gas path system 50 therethrough. In the engine gas path system 50 there is provided a combustor 28 to constitute a gas generator section 26.

When the engine is tested for dynamic characterizations according to one embodiment, exciting pressure pulses are generated in series, for example, by an apparatus which may be referred to as an exciter 30, in a fluid flow (not indicated) such as a compressed air flow bled from the high pressure compressor assembly 22. The exciting pressure pulses may be optionally generated in an air flow to be injected into the engine gas path system 50. The generated exciting pressure pulses in the air flow may vary in frequency. Such exciting pressure pulses in the air flow injected into or bled from the gas turbine engine cause pressure fluctuations in gases passing through the engine gas path system 50. Pressure responses in the engine gas path system 50 and structural vibratory responses of engine mechanical structures may be detected at one or more locations of the engine. These responses can be recorded and measured, for example, by respective pressure sensor 32 and displacement sensor 34, and may be further processed by a data processor or a computer 36, if required. The measured responses may be further analyzed for engine dynamic characteristics. The engine dynamic characterization test will be further described in detail below with reference to particular embodiments.

Although it is desirable to conduct such testing for engine dynamic characterization under engine operating conditions, it should be noted that testing of engine dynamic characterization also can be conducted while the engine is not in operation, if desired. Testing with engine inoperative applies only to the pressure pulsing air injection arrangement since there is no pressurized air to be bled in the bleed arrangement.

Figure 4:
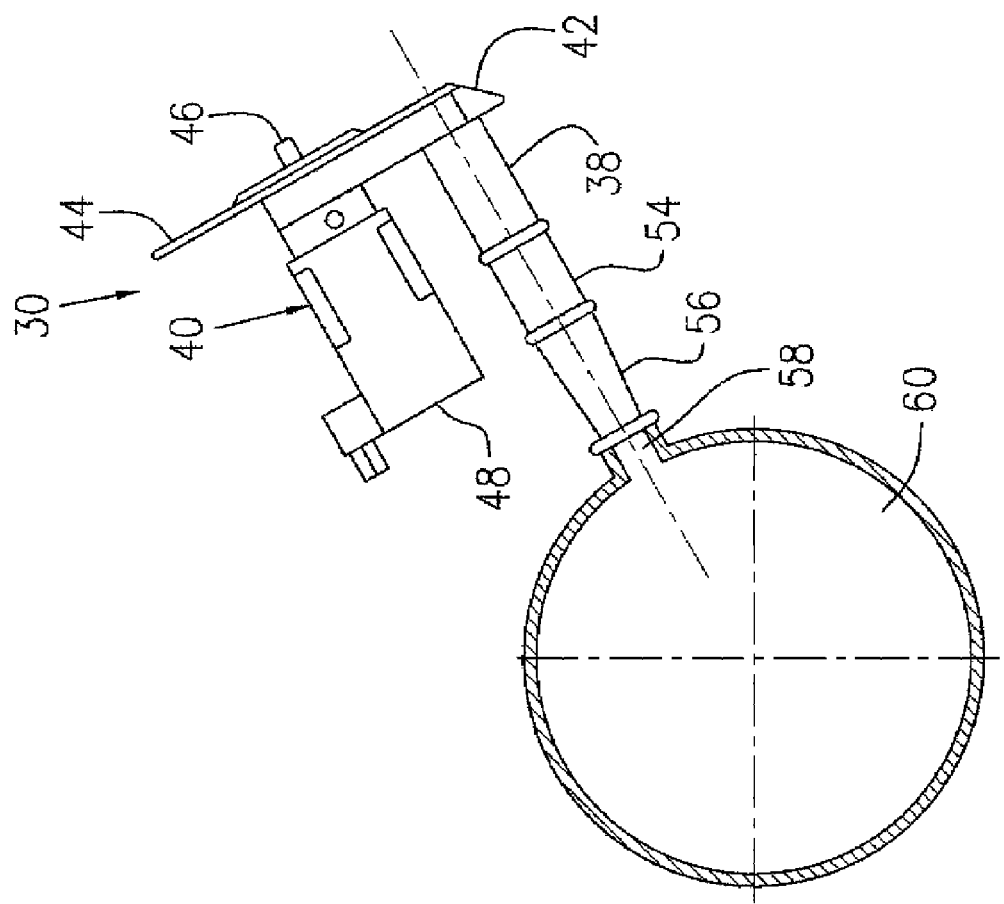
FIG. 4 is a schematic illustration of the apparatus of FIG. 2, used to generate exciting pressure pulses in an air flow bled from a pressure system of the engine, according to one embodiment.

Referring to FIGS. 1, 2 and 4, the exciter 30 according to one embodiment may include an exciting air flow pipe 38 for directing an air flow into or from the gas turbine engine, and a pressure pulsing device 40 for generating a plurality of exciting pressure pulses in the air flow directed through the exciting air flow pipe 38. A base 42 is provided for supporting the exciting air flow pipe 38 and the pressure pulsing device 40.

In particular, the pressure pulsing device 40 may include a rotating pulsing wheel 44 mounted to a shaft 46 to rotate together therewith. The shaft 46 in turn is rotatably supported by the base 42 and is driven by a motor 48. (The shaft 46 may be part of the motor 48.) The motor 48 may optionally be a speed-adjustable electric motor, or other types such as pneumatically or hydraulically powered motors and are also supported by the base 42. The shaft 46 can be driven directly by the motor 48, as illustrated in the drawings according to this embodiment, or through a gear box (not shown) or other torque transmission mechanism (not shown), such that the pulsing wheel 44 can be rotated at varying speeds within a desired range.

The pulsing wheel 44 includes a plurality of openings 52 circumferentially spaced apart one from another. The exciting air flow pipe 38 is mounted to the base 42 in a direction substantially parallel with the shaft 46. The base 42 is configured to allow one end of the exciting air flow pipe 38 to be alternately blocked by the circumferential portions of the pulsing wheel 44 between adjacent openings 52 and opened by at least a portion of one of the openings 52 which aligns with the exciting air flow pipes 38 when the pulsing wheel 44 rotates. Therefore, a pulsing air flow as illustrated in FIG. 6a is formed when passing through the exciting air flow pipe 38 and being interrupted by the rotating pulsing wheel 44, as illustrated in FIG. 6a.

A valve 54 is optionally provided and may be connected to the exciting air flow pipe 38 at an end thereof opposite to the end adjacent to the pulsing wheel 44. The valve 54 can be adjusted to control the flow rate of the air flow passing through the exciting air flow pipe 38. When the pulsing wheel 44 rotates while an air flow is passing through the exciting air flow pipe 38, the valve 54 is properly pre-adjusted in order to produce a desired maximum magnitude of flow pulses as illustrated in FIG. 6a. An adapter 56 may be optionally provided and attached, for example, to the valve 54, for connecting the exciting air flow pipe 38 to a port 58 (see FIG. 4) of the engine in order to allow the exciting air flow pipe 38 to extract an air flow from or to inject an air flow into the engine. The adapter 56 may, for example, be a section of a pipe having varying diameters and different sizing of two open ends. One end of the adapter 56 is sized to be connected with the exciter 30 mounted directly on the exciting air flow pipe 38 or may be connected through the valve 54 or any other part of the exciter 30, while the other open end of the adapter 56 is particularly sized for connection with a selected port in the engine for extracting or injecting an air flow from or into the engine for a test of engine characteristics.

FIG. 4 illustrates in particular, a dynamic engine characterization test using the exciter 30 according to one embodiment. A free end of the adapter 56 is connected to a port of the engine in fluid communication with the engine gas path system 50 of FIG. 1, for example, the port 58 of a plenum 60 defined within the engine and in fluid communication with the engine gas path system. The plenum 60 is continuously filled with pressurized air, for example, P3 bleed air, during engine operation. The pressurized air within the plenum 60 may be extracted by the exciter 30 through the adapter 56, valve 54 and the exciting air flow pipe 38 in a controlled manner. The valve 54 is pre-adjusted to allow the pressurized air in the plenum 60 to be discharged at a predetermined flow rate when the exciting air flow pipe 38 is fully opened. When the pressurized air in the plenum 60 is being extracted through the exciting air flow pipe 38, the flow passing through the pipe 38 is also affected by the rotation of the pulsing wheel 44, as previously described and illustrated in FIG. 6a. The alternately closing and opening the exciting air flow pipe 38 by the rotation of the pulsing wheel 44, will also cause pressure fluctuations in the air flow upstream of the pulsing wheel 44. When the exciting air flow pipe 38 is closed by the pulsing wheel 44, the pressure of the air flow is instantly prevented from moving, thereby causing a maximum pressure substantially equal to the pressure of the pressurized air in the plenum 60. When the exciting air flow pipe 38 is gradually opened by the rotation of the pulsing wheel 44, the air flow in the exciting air flow pipe 38 begins to move at an increased flow rate until the pipe 38 is fully opened by one of the openings 52 of the pulsing wheel 44. This causes pressure drops in the air flow and the pressure reaches a minimum value when the flow rate in the pipe 38 is at a maximum. Therefore, a plurality of pressure pulses as illustrated in FIG. 6b is created in the air flow passing through the exciting air flow pipe 38.

Figure 6A:
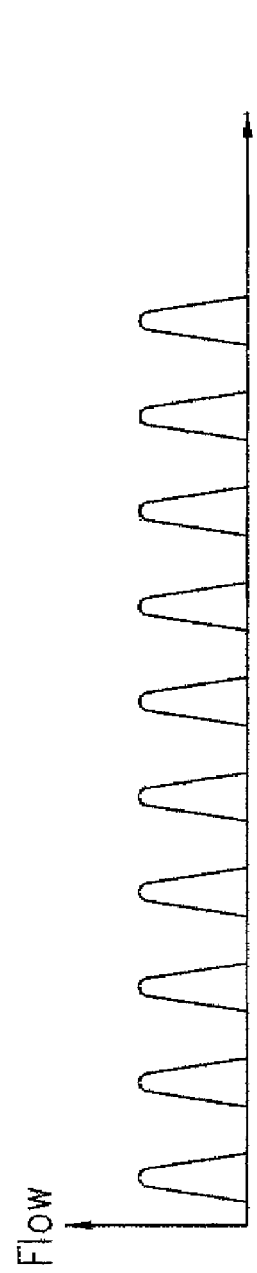
FIG. 6a is a graphic illustration of an air flow rate of an air flow with flow pulses controlled by the apparatus of FIG. 2, according to one embodiment.
Figure 6B:
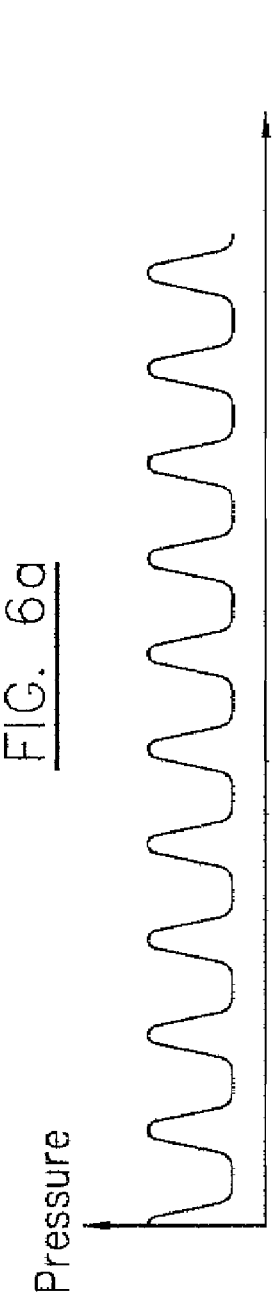

The flow rate pulses and the pressure pulses illustrated in respective FIGS. 6a and 6b, represent a condition in which the pulsing wheel 44 rotates at a constant speed without change. Therefore, the pulses in FIGS. 6a and 6b represent a same single frequency. When the valve 54 is adjusted, the magnitude of the pulses in both FIGS. 6a and 6b will change. It is understood that when the pulsing wheel 44 rotates at a varying rotational speed driven by the speed-adjustable motor 48, the pulses in FIGS. 6a and 6b will represent varying frequencies.

The pressure pulses generated in the air flow passing through the exciting air pipe 38, as illustrated in FIG. 6b, will propagate throughout the entire engine gas path system through the pressurized air in plenum 60, which affects gas pressure fluctuation differently at different locations of the engine gas path system. The different fluid pressure responses (fluctuation) in the different locations of the engine gas path system also affects adjacent engine structure such as casings, pipe lines, vanes, etc., causing different structural vibratory responses.

Pressure responses in the engine gas path system and structural vibratory responses in the engine structures in each location will vary with variations of the frequency of the exciting force which acts in a fluid, for example, a pressurized air flow, passing through the engine gas path system. In one embodiment, the variations of the frequency of the exciting force may be achieved by rotating the pulsing wheel 44 at a varying rotational speed to change the time interval between the opening and blocking of the air flow pipe 38. It should be noted however, that although the pressure pulses generated by the exciter 30 as shown in FIG. 6b have a single frequency when the pulsing wheel 44 rotates at a consistent speed, the exciting forces in the air flow passing through the exciting air flow pipe 38 will include more than one single frequency, likely a main frequency substantially equal to the frequency of the pulses with a number of side frequencies because the pressure pulses as shown in FIG. 6b are not in a regular single sine wave and the energy carried by the pulses is actually distributed on a frequency spectrum. Nevertheless, it is suggested to rotate the pulsing wheel 44 at a varying speed which generates the pressure pulses at those varying frequencies, to ensure the exciting energy carried by the exciting pressure pulses is distribute in a broad frequency spectrum. The frequency spectrum of the exciting forces are expected to include all major frequencies at which any potential major responses in a system pressure or structural vibration may occur.

The system pressure response and the engine structural vibratory responses may be detected and measured, for example by respective pressure sensor 32 and displacement sensor 34 at selected individual locations of the engine, as illustrated in FIG. 1. These measured responses are signals in a time frame and can be further analyzed by, for example, processing and calculation with a data processor 36 (see FIG. 1) to obtain values in a frequency domain, which is the energy distribution in a frequency spectrum, as shown in FIGS. 8 and 9.

Figure 8:
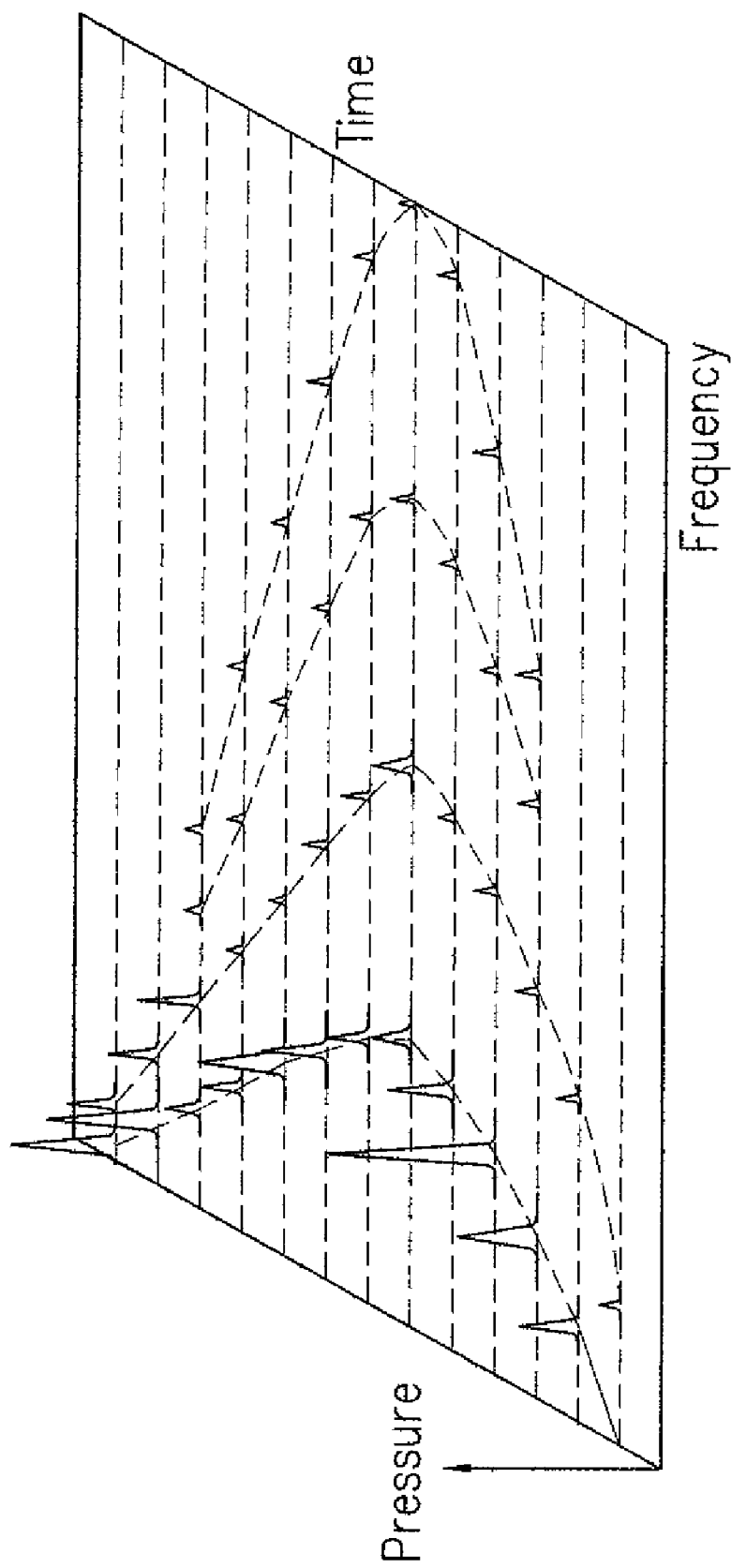
FIG. 8 is a graphic illustration of a system pressure response to flow excitation showing a result of a turbine engine dynamic characterization test.

FIG. 8 schematically illustrates the pressure responses measured at a location of the engine gas path system, and shows an example 3-D representation of the pressure pulsing excitation. The x-axis is the frequency, the y-axis is the time and the z-axis is the pressure fluctuation amplitude. It shows a particular condition where the exciter wheel speed varies in time, noticeable on the figure by the time varying frequency. The wheel initially accelerates to a given point and then decelerates inducing various excitation frequencies in the system.

Figure 9:
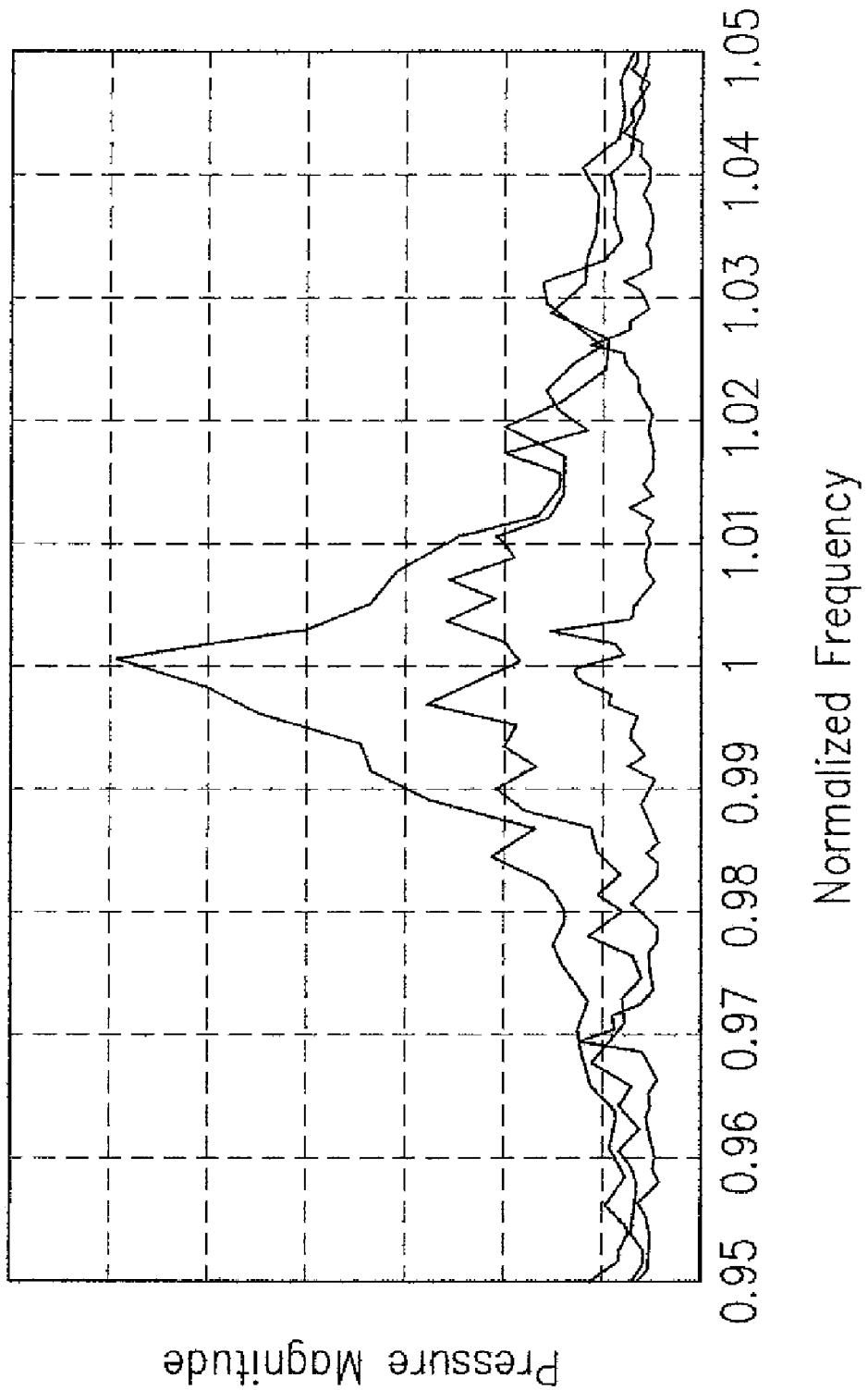
FIG. 9 is a graphic illustration of an arbitrary structural response to flow excitation showing another result of a turbine engine dynamic characterization test.

FIG. 9 schematically illustrates an example of the structure vibratory responses measured at a location of the engine structure. The x-axis shows the normalized frequency, i.e. the frequency of vibration divided by structural natural frequency. The response of three different structural modes, for which the magnitude is shown on the y-axis, is plotted. The method allows comparison of the amplification ratios associated with various vibration modes. The information included in FIGS. 8 and 9 can be further analysed according to engine structure and operation conditions, thereby obtaining characteristics of the engine fluid system and the engine structure which can be further considered with respect to future engine design or to improving the engine gas path system and/or structures of the current engine design, if it is necessary and desired.

Figure 7:
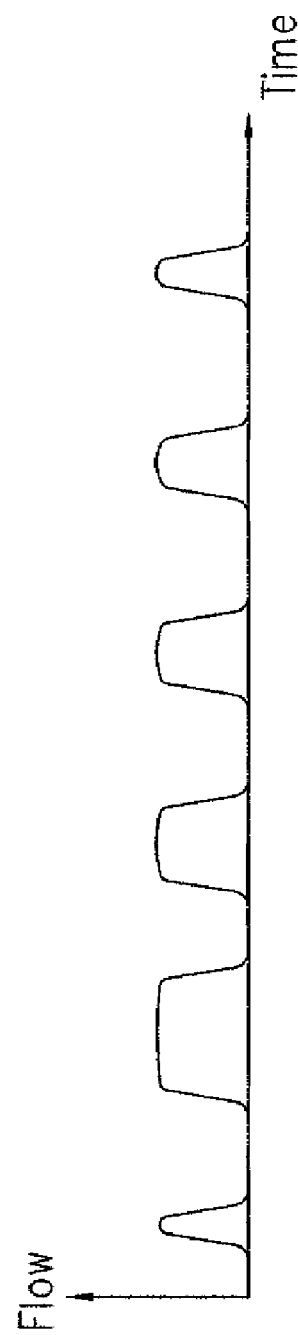
FIG. 7 is a graphic illustration of an exciting pressure pulses generated in an air flow by the apparatus of FIG. 3 according to another embodiment.

FIG. 3 illustrates an exciter 30a according to another embodiment. The exciter 30a is similar to the exciter 30 of FIG. 2 and like components and features will not be redundantly described herein. The difference between the exciter 30a and the previously described exciter 30 in FIG. 2 lies in that the openings 52a in the pulsing wheel 44a are sized differently. Only one of the openings 52a located in the bottom of the pulsing wheel 44a is a round opening having a predetermined diameter. The remaining openings 52a are in a shape of circumferentially extending slots, having a radial dimension substantially equal to the diameter of the round opening and with circumferentially extending dimensions. The circumferentially extended dimensions of the respective openings 52a are gradually reduced in a counter-clockwise sequence starting from the opening 52a adjacent to the round opening 52a. The pulsing wheel 44a of the exciter 30a, when rotating at a constant rotational speed, will allow a fluid flow such as an air flow to pass therethrough in a fluctuating pattern as shown in FIG. 7. The flow pulses shown in FIG. 7 have substantially the same magnitudes but different pulse widths. In contrast to the flow pulses shown in FIG. 6b, the width-varying flow pulses shown in FIG. 7 contain more frequency components. The exciter 30a when used in a dynamic engine characterization test, similar to the exciter 30 illustrated in FIG. 4, will generate width-varying pressure pulses (not shown) in the flow passing through the exciting air flow pipe 38, causing the exciting energy to be spread in a wider frequency spectrum than a frequency spectrum which may be a result from using the exciter 30. The pulsing wheel 44a of the exciter 30a may also rotate at varying speeds to generate width-varying pressure pulses in the air flow passing through the exciting air flow pipe 38 with varying frequencies, thereby spreading the exciting energy in an even wider frequency spectrum.

Figure 5:
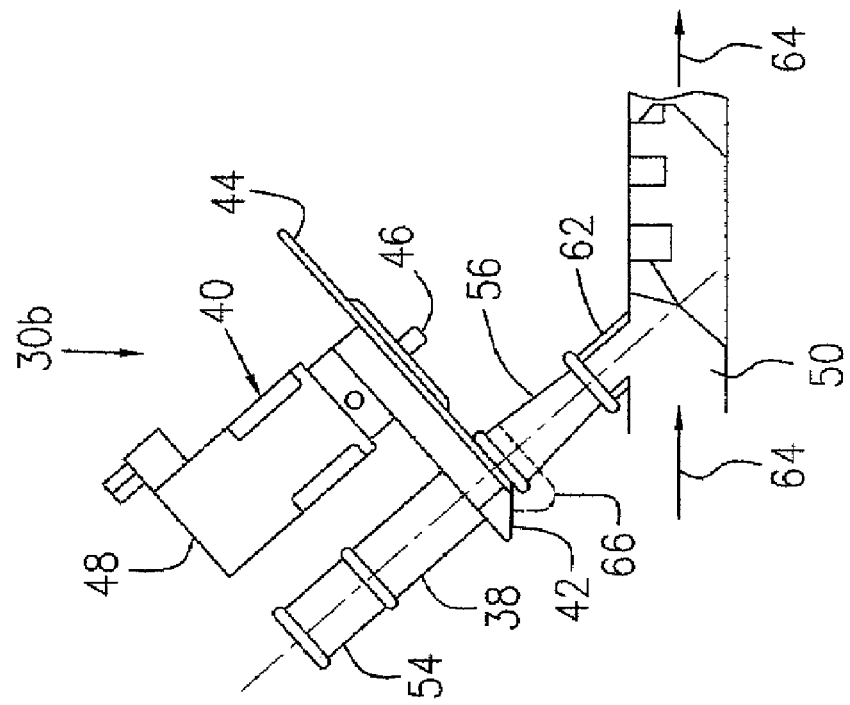
FIG. 5 is a schematic illustration of an apparatus used to generate exciting pressure pulses in an air flow injected into a gas path of the engine, according to another embodiment.

FIG. 5 illustrates a test for dynamic engine characterization using an exciter 30b according to a further embodiment. Exciter 30b is similar to the exciter 30 in FIG. 2 and/or exciter 30a in FIG. 3, and like components and features will be indicated by numerals similar to those in FIG. 2 and will not be redundantly described in detail. The openings (not shown) in the pulsing wheel 44 of exciter 30b may be similar to those in FIG. 2, or to those in FIG. 3 or may be in other shapes and sizes.

The exciter 30b is used to generate pressure pulses in a fluid flow such as an air flow to be injected into, rather than extracted from the engine gas path system 50. In exciter 30b the adapter 56 may be positioned at the other side of the pulsing wheel 44 and properly supported by the base 42, for example, by means of a bracket schematically illustrated by the broken line 66 such that the pulsing wheel 44 is positioned in a middle of a passage defined by the valve 54, the exciting air flow pipe 38 and the adapter 56, for alternately opening and closing this passage. The free end of the adapter 56 is specially sized for and connected to a port 62 of the engine leading to, for example, a section of the gas path system 50. An arrow indicated by numeral 64 represents a gas flow through the section of the gas path system 50. The valve 54 which is mounted to the upstream end of the exciting air flow pipe 38 is connected to an external source for supplying continuous pressurized air flow as the exciting flow for the dynamic engine characterization test. The pressurized air supplied by the external source has a pressure value greater than the maximum pressure of the gas flow 64 passing through the section of the gas path system 50, to ensure injection of the exciting flow into the engine.

The optional addable or omittable components or elements which have been described in detail with reference to the embodiment in FIG. 2, are also applicable to the exciter 30b and will not be repeated herein. The generation of the flow pulses and the pressure pulses will be similar to those described with reference to FIGS. 4, 6a-6b and 7 and will not be redundantly described herein. Nevertheless, in contrast to the exciter 30 used in the test of FIG. 4, the exciter 30b injects pressurized air flow into, rather than extracting pressurized air flow from the engine, thereby generating the exciting pressure pulses in the air flow injected into a main gas flow 64 passing through the gas path system 50, without phase shifting with respect to the flow pulses of the same air flow. This is because when the pulsing wheel 44 of the exciter 30b fully opens the passage defined by the valve 54, the exciting air flow pipe 38 and the adapter 56, to allow a maximum flow to be injected into the gas path system 50, the injected pressurized air flow adds additional pressure to the gas flow 64 passing through the gas path system 50, thereby resulting in a maximum air pressure therein.

The engine characterization test conducted by extracting pressurized air flow from the engine in a pressure pulsing pattern as illustrated in FIG. 4, or by injecting a pressurized air flow into the engine with a pressure pulsing pattern as illustrated in FIG. 5, will result in substantially similar system pressure and structural vibratory responses which may be detected and measured. The measured values may be further analyzed for information regarding engine characteristics, for example by processing and calculation to obtain useful information as illustrated in FIGS. 8 and 9.

The above description is meant to be exemplary only, and one skilled in the art will recognize that changes may be made to the embodiments described without departure from the scope of the invention disclosed. For example, a turbofan bypass duct gas turbine engine is used to illustrate the engine characterization test of the present invention. Nevertheless, the present invention is applicable to any other type of engine. Locations in the engine used for exciting the engine fluid and measuring system and structural vibratory responses may vary other than those illustrated in FIG. 1 of this application. A rotating body such as a bladed rotor or other configurations, may replace the pulsing wheel to function as a mechanism for alternatingly opening and blocking a passage such as the exciting air flow pipe. Still other modifications which fall within the scope of the present invention will be apparent to those skilled in the art, in light of a review of this disclosure, and such modifications are intended to fall within the appended claims.

The invention claimed is:

1. A method for conducting dynamic characterization of a gas turbine engine, comprising:
    (a) generating a plurality of exciting pressure pulses in series in an air flow passing through a main gas path of the gas turbine engine, the exciting pressure pulses having varying frequencies;
    (b) measuring a response in at least one location of the gas turbine engine, excited by the exciting pressure pulses with varying frequencies; and
    (c) analyzing the measured response for engine dynamic characteristics, wherein the measured response is a structural vibratory response of an engine mechanical structure.

2. The method as defined in claim 1 wherein steps (a) and (b) are conducted when the engine is operating.

3. The method as defined in claim 1 wherein step (a) is practised by intermittently injecting said air flow into the main gas path of the gas turbine engine at the varying frequencies.

4. The method as defined in claim 1 wherein step (a) is practised by intermittently bleeding said air flow from the gas turbine engine at the varying frequencies.

5. The method as defined in claim 4 wherein the intermittently bled air flow is generated by a compressor of the gas turbine engine.

6. The method as defined in claim 1 wherein the exciting pressure pulses in series are variable in magnitude.

7. The method as defined in claim 1 wherein step (a) is conducted by generating the exciting pressure pulses in series in said air flow passing through a passage, the passage being in fluid communication with the main gas path of the gas turbine engine to thereby allow the exciting pressure pulses to propagate into the main gas path.

8. The method as defined in claim 7 wherein the generating of the exciting pressure pulses in the air flow is achieved by alternately opening and blocking the passage.

9. The method as defined in claims 8 comprising changing time intervals between the alternate opening and blocking of the passage to thereby achieve the varying frequencies of the exciting pressure pulses.

10. An apparatus for gas turbine engine dynamic characterization comprising:
    a passage adapted to be connected to the gas turbine engine in fluid communication with a main as path of the gas turbine engine;
    a mechanism including a body having a plurality of openings, the body being rotatable in the airflow to alternately open and block the passage for generating a series of exciting pressure pulses in the airflow; and
    a motor adapted to rotate the body in a varying rotational speed to change frequencies of the generated exciting pressure pulses.

11. The apparatus as defined in claim 10 further comprising means for adjusting a magnitude of the exciting pressure pulses.

12. An apparatus for generating a plurality of pressure pulses in an air flow for testing dynamic characteristics of a gas turbine engine, the apparatus comprising:
    an air flow passage adapted to be connected to the gas turbine engine to allow an air flow to be injected into or bled from a main gas path of the gas turbine engine; and
    a pressure pulsing device including a rotating body for generating the plurality of pressure pulses in the air flow with varying frequencies, the rotating body intermittently interrupting the air flow provided through the air flow passage.

13. The apparatus as defined in claim 12 wherein the pressure pulsing device comprises a valve for adjusting a maximum flow rate of the air flow passing through the flow pipe, thereby adjusting a magnitude of the generated pressure pulses in the air flow.

14. The apparatus as defined in claim 12 wherein the rotating body comprises a plurality of openings and is rotated by a speed-adjustable motor.

* * * * *